Patented June 2, 1942

2,285,242

UNITED STATES PATENT OFFICE 2,285,242

MANUFACTURE OF BARIUM SULPHATE

Isaac Ephraim Weber, Luton, and William Stanley Wood, Harpenden, England

No Drawing. Application December 12, 1936, Serial No. 115,634. In Great Britain December 29, 1935

3 Claims. (Cl. 23—122)

One process of making barium sulphate or blanc fixe consists in preparing a barium chloride solution from witherite or precipitated barium carbonate or barium sulphide and allowing this solution to react with sulphuric acid.

Another process consists in adding free sulphuric acid to a barium carbonate suspension with or without the presence of hydrochloric acid or a chloride in such a manner that no substantial accumulation of free acid in the suspension is permitted.

The present invention makes barium sulphate by the reaction of sulphuric acid on an alkaline barium compound such as barium sulphide, barium hydrate or finely subdivided barium carbonate (which is herein regarded as an alkaline barium compound), the feature of invention being that the reaction mixture is maintained during the reaction at a range of pH value from 0.5 to 3.

It is not possible to make a barium sulphate suitable for incorporating with pigments or for use in paper manufacture by the reaction of a solution of barium sulphide (obtained by lixiviating a barium sulphide clinker) with sulphuric acid. If the sulphuric acid is added slowly to a solution of barium sulphide a blanc fixe is obtained which is harsh in texture and poor in colour. On the other hand, if the method of addition is reversed, i. e. the barium sulphide is added to a solution of sulphuric acid, again an unsatisfactory blanc fixe is obtained from the point of view of colour and texture.

In the manufacture of a blanc fixe or barium sulphate from barium sulphide by this invention the difficulties above referred to are overcome and a blanc fixe eminently suitable for incorporating with paints or pigments or in the manufacture of composite pigments or paper or for fillers is obtained. By this invention the blanc fixe is prepared by the simultaneous introduction into a reaction vessel fitted with suitable stirring gear of barium sulphide and sulphuric acid, and a pH-value between 0.5 and 3 is maintained during the process of manufacture, in contradistinction to the present known methods, wherein the reaction occurs in the presence of an excess of alkaline barium compound and no substantial accumulation of free acid is permitted or the reaction is between barium chloride and sulphuric acid.

The pH-value of from 0.5 to 3 is obtained by the addition of an acid or a mixture of acids capable of giving a barium salt or salts soluble in the same acid or same mixture of acids within a pH range of from 0.5 to 3, to a portion of the barium compound used in the manufacture of the barium sulphate; this addition may be entirely to a portion of barium compound used in the manufacture, or in part so and in part to the sulphuric acid used for precipitating the barium sulphate. A further possibility is the addition of the requisite acid as a third stream flowing into the reaction vessel. Thus amongst the acids which may be used are hydrochloric acid, phosphoric acid, or hydrofluoric acid or a mixture of these. Alternatively, the said acids may be generated in situ by the addition of a barium salt or salts of such acid or acids which will react with the sulphuric acid to give a solution with a pH-value of from 0.5 to 3.

Preferably no free sulphuric acid or soluble sulphate is present during the precipitation of the barium sulphate.

The pH-value of from 0.5 to 3 may also be obtained by the addition to water of any one or a mixture of acids capable of giving a barium salt or salts soluble in the same acid or mixture of acids within a pH-value of from 0.5 to 3 and maintaining such pH range by the simultaneous addition of a solution of barium sulphide or other water-soluble alkaline barium salt and the sulphuric acid. If during the manufacture pH-value 3 is exceeded then the dry blanc fixe is harsher in texture, the harshness increasing with increase of pH-value and furthermore the whiteness of the blanc fixe deteriorates.

The range of pH-value from 0.5 to 3 may also be maintained during the manufacture of the blanc fixe or barium sulphate by the alternate additions of the alkaline barium compound and the sulphuric acid to the solution of one or a mixture of acids capable of giving a barium salt or salts soluble in the same acid or mixture of acids within a range of pH from 0.5 to 3.

The following are examples of the invention:

Example 1

To 100 gallons of water are added 1.2 gallons of 1500 specific gravity phosphoric acid and 5 gallons of 1150 specific gravity hydrochloric acid. A freshly prepared solution of barium sulphide at 60° C. containing approximately 100 grams of barium sulphide per litre and sulphuric acid of specific gravity 1840 are now added separately and simultaneously, with thorough stirring, to the above acid solution at such rates respectively that the pH-value of the batch is maintained within the range of 1 to 2. The pH may be controlled either by an indicator, e. g. thymol blue which gives violet-red at pH 1.2 and orange at pH 2, or by the use of an automatic pH recorder. Simultaneous additions of barium sulphide solution and sulphuric acid are made until one thousand gallons of the barium sulphide solution have been added. The barium sulphate slurry is removed from the reaction vessel and is washed by decantation or can be filtered and washed by any of the well known means. The dried barium sulphate is a good white colour and of extremely soft texture; it is eminently suitable for incorporation with titanium or other pigments.

*Example 2*

To 100 gallons of water are added 1.2 gallons of 1500 specific gravity phosphoric acid and 5 gallons of 1150 specific gravity hydrochloric acid. A freshly prepared solution of barium sulphide at 40° C. containing approximately 100 grams of barium sulphide per litre and sulphuric acid of specific gravity 1840 are now added separately and simultaneously, with thorough stirring, to the above acid solution, care being taken by adjusting the rates of flow that the pH value of the batch remains within the range of 2.5 to 3. The pH may be controlled either by indicators, e. g. yellowish orange to thymol blue (pH 2.5) and greenish yellow to bromo phenol blue (pH 3) or by the use of an automatic pH recorder. Simultaneous additions of barium sulphide solution and sulphuric acid are made until 1000 gallons of the barium sulphide solution have been added. The barium sulphate slurry is removed from the reaction vessel and is washed by decantation or can be filtered and washed by any of the well known means.

The barium sulphate pulp obtained is eminently suitable for the filling or coating of paper.

*Example 3*

To 100 gallons of water are added 8 gallons of hydrochloric acid of a specific gravity of 1150. While thoroughly stirring simultaneously addition is then made of a solution of barium hydrate containing 220 grams $Ba(OH)_2 8H_2O$ per litre at a temperature of 60° C. and, separately, sulphuric acid, specific gravity 1840, at rates necessary for maintaining the batch in the reaction vessel at a pH value of 2.

The pH may be controlled either by thymol blue as indicator which gives an orange colour at pH 2 or an automatic pH recorder may be used. The simultaneous addition of the barium hydrate and sulphuric acid is made until 1000 gallons of barium hydrate have been added. The barium sulphate is filtered, washed and dried; it is a very soft textured material which is eminently suitable for medicinal purposes in X-ray radiology.

*Example 4*

To 100 gallons of water are added one gallon of phosphoric acid of 1500 specific gravity and 4 gallons of commercial hydrofluoric acid of specific gravity 1190. The simultaneous addition of barium sulphide solution and sulphuric acid is carried out on the lines given in Example 2. The barium sulphate pulp is eminently suitable for the manufacture of composite titanium pigments by hydrolysing a titanium sulphate solution on a base of such barium sulphate.

*Example 5*

To 100 gallons of water are added 1 gallon of 1500 specific gravity phosphoric acid and 5 gallons of 1150 specific gravity hydrochloric acid. A freshly prepared solution of barium sulphide at 60° C. containing approximately 100 grams of barium sulphide per litre is added to the above acid solution to give a pH value of 2. Sulphuric acid is then added to give a pH value of 1 and alternate additions of barium sulphide and sulphuric acid are made to maintain the batch between these pH limits. The additions are continued until 1000 gallons of the barium sulphide solution have been added. The barium sulphate slurry is removed from the reaction vessel and is washed by decantation or by other well known means. The pH range may be controlled by thymol blue indicator or by the use of an automatic pH recorder.

The dry barium sulphate is eminently suitable for mixing with titanium or other pigments for use in paints, enamels, rubber or the like.

The sulphuretted hydrogen which is a by-product in the manufacture of barium sulphate from barium sulphide by the above methods is removed and can be converted to sulphuric acid, or sulphur, or dealt with in any well known manner.

When barium carbonate is used it is run into the reaction vessel in the form of a suspension. Otherwise the procedure resembles that described in the foregoing examples.

It is understood that the process is not limited to the specific examples given above, e. g. sulphuric acid of varying strengths may be used including oleum. The strengths of solutions of the alkaline barium compound may also be varied subject to the maintenance of a pH value of 0.5 to 3 during the manufacture.

We claim:

1. A method of manufacturing a barium sulphate or blanc fixe, which comprises introducing into a vessel a solution of barium sulphide and a solution of sulphuric acid in small proportions, the proportion of the barium sulphide to the sulphuric acid being so balanced that substantially no free $SO_4$ ions are present in the vessel during the reaction, free acid other than sulphuric acid being present in a quantity sufficient to maintain the mixture during the reaction at a range of pH value from 0.5 to 3.

2. A method of manufacturing a barium sulphate or blanc fixe, which comprises introducing simultaneously into a vessel a solution of barium sulphide and sulphuric acid, the proportion of the barium sulphide to the sulphuric acid being so balanced that substantially no free $SO_4$ ions are present in the vessel during the reaction, free acid other than sulphuric acid being present in a quantity sufficient to maintain the mixture during the reaction at a range of pH value from 0.5 to 3.

3. A method of manufacturing a barium sulphate or blanc fixe, which comprises introducing alternately into a vessel a solution of barium sulphide and sulphuric acid, the proportion of the barium sulphide to the sulphuric acid being so balanced that substantially no free $SO_4$ ions are present in the vessel during the reaction, free acid other than sulphuric acid being present in a quantity sufficient to maintain the mixture during the reaction at a range of pH value from 0.5 to 3.

ISAAC EPHRAIM WEBER.
WILLIAM STANLEY WOOD.